United States Patent [19]

Miller et al.

[11] Patent Number: 5,446,833
[45] Date of Patent: Aug. 29, 1995

[54] TEXTURED SPHERE AND SPHERICAL ENVIRONMENT MAP RENDERING USING TEXTURE MAP DOUBLE INDIRECTION

[75] Inventors: Gavin S. P. Miller, Mountain View; Shenchang E. Chen, Sunnyvale, both of Calif.

[73] Assignee: Apple Computer, Inc., Cupertino, Calif.

[21] Appl. No.: 205,137

[22] Filed: Feb. 28, 1994

Related U.S. Application Data

[63] Continuation of Ser. No. 880,240, May 8, 1992, abandoned.

[51] Int. Cl.[6] .............................................. G06F 15/72
[52] U.S. Cl. ..................................... 395/125; 395/137
[58] Field of Search ............... 395/125, 127, 129, 130, 395/137, 119

[56] References Cited

U.S. PATENT DOCUMENTS

| | | | |
|---|---|---|---|
| 4,736,436 | 4/1988 | Yasukawa et al. | 382/16 |
| 4,752,836 | 6/1988 | Blanton et al. | 358/342 |
| 4,807,158 | 2/1989 | Blanton et al. | 395/125 |
| 4,821,212 | 4/1989 | Heartz | 395/125 |
| 4,841,292 | 6/1989 | Zeno et al. | 345/121 |
| 4,899,293 | 2/1990 | Dawson et al. | 395/125 |
| 4,935,879 | 6/1990 | Ueda | 395/130 |
| 5,051,734 | 9/1991 | Lake, Jr. | 364/731 |
| 5,161,013 | 11/1992 | Rylander et al. | 395/125 |
| 5,175,808 | 12/1992 | Sayre | 395/125 |
| 5,179,638 | 1/1993 | Dawson et al. | 395/125 |
| 5,204,944 | 4/1993 | Wolberg et al. | 395/119 |
| 5,224,208 | 6/1993 | Miller, Jr. et al. | 395/125 |

OTHER PUBLICATIONS

Foley, James D. et al., "Computer Graphics: Principals and Practice", 2nd ed., 1990, pp. 91, 657, 680, 715, 1156.
Williams, Lance, "Pyramidal Parametrics," Computer Graphics, vol. 17, No. 3, Jul. 1983 pp. 1–11.
Greene, Ned, "Environment Mapping and Other Applications of World Projections," IEEE Computer Graphics and Applications, vol. 6, No. 11, Nov. 1986, pp. 21–29.
Gardner, Geoffrey Y., "Simulation of Natural Scenes Using Textured Quadric Surfaces," Computer Graphics, vol. 18, No. 3, Jul. 1984, pp. 11–20.
Ken Perlin, "An Image Synthesizer," Computer Graphics, vol. 19, No. 3, 1985 pp. 287–296.

*Primary Examiner*—Mark R. Powell
*Assistant Examiner*—Huynh Ba
*Attorney, Agent, or Firm*—Blakely, Sokoloff, Taylor & Zafman

[57] ABSTRACT

A method and apparatus for rendering textured spheres and spherical environment maps. The method of the present invention provides for real time rotation of a textured sphere and panning of the view into a spherical environment map, along multiple axes without the need for special rendering hardware. A two-level indexing scheme for accessing pixel data in a texture map, is used to identify shading values for pixels in a display window. The two-level indexing scheme is comprised of a screen look-up table and a parametric look-up table. The screen look-up table has the dimensions of the display window, whereas the parametric look-up table has the dimensions of the parametric spherical environment map (wherein the pixel addresses are rotated 90 degrees from the origin). The method for the present invention is comprised primarily of the steps of: providing a parametric spherical environment map of the image to be viewed, generating a screen look-up table comprised of look-up addresses, generating a parametric look-up table comprised of index values into the parametric spherical environment map, and for each look-up address in the screen look-up table, mapping to an entry in the parametric look-up table, retrieving the value in the entry, and using the value to retrieve pixel values from the parametric spherical environment map. Rotation or movement of the view being seen is accomplished by adding offsets to the look-up address and/or the index values.

22 Claims, 8 Drawing Sheets

FIG—1

FIG_2

FIG_4

FIG_5

FIG_6

FIG_7

FIG_8

TEXTURED SPHERE AND SPHERICAL ENVIRONMENT MAP RENDERING USING TEXTURE MAP DOUBLE INDIRECTION

This is a continuation of application Ser. No. 07/880,240, filed May 8, 1992, abandoned.

BACKGROUND OF THE INVENTION

1. Field of the Invention

The present invention relates to the field of pixel rendering, in particular to the field of rendering textured spheres and spherical environment maps.

2. Description of the Related Art

Pixel rendering refers to the generation of pixel values for displaying an image. An environment map is an image or collection of images which characterize the appearance of a scene when viewed from a particular position. Each type of environment map has an associated projection which is used to compute the appearance along a ray traveling in a particular direction towards the camera. Not all types of environment maps capture the scene in every direction.

A variety of different forms of environment maps have been used in the past. An orthographic projection of a reflecting sphere to characterize the illumination of a scene is described by Williams in "Pyramidal Parametrics", *Computer Graphics*, Vol. 17, No. 3, pgs. 1–11, July, 1983. The intention was to use the environment map as an aid to the rapid computation of specular reflections. In an article by Greene entitled "Environment Mapping and Order Applications of Worlds Projections", *IEEE Computer Graphics and Applications*, Vol. 6, No. 11, pgs. 21–29, November, 1986, six images on the faces of a cube are used for a "cubic environment map". This mapping was used to resample synthetic images of a scene to be redisplayed in the form of an Omnimax wide angle lens projection system as well as for the computation of reflections.

Spherical Environment Maps

There are a number of types of spherical projection which may be used to store environment maps. Two are of particular interest, namely spherical reflection maps, and parametric spherical maps.

Spherical reflection maps store an image of the environment as an orthographic projection of a sphere shaded with a perfect reflection of the surrounding scene. Typically, these maps are circular images of spheres within a square array of pixels. These maps are useful for the computation of reflections and illumination when rendering specular surfaces. They do, in fact, sample the entire orientation space. However, they have the disadvantage that the orientations near the silhouette of the sphere are very sparsely sampled. This renders them unsuitable as a representation for all-round interactive viewers.

Parametric spherical environment maps store the environment data in a rectangular image where the (x, y) coordinates of a pixel, map linearly to points on a sphere which are defined by the ($\theta$, $\phi$) spherical (or angular) coordinates of a corresponding direction vector.

The relationship between the direction vector and the angular coordinates is given by:

$$D_x = \cos(\theta) \sin(\phi)$$

$$D_y = \cos(\theta) \cos(\phi)$$

$$D_z = \sin(\theta)$$

Figure 1:
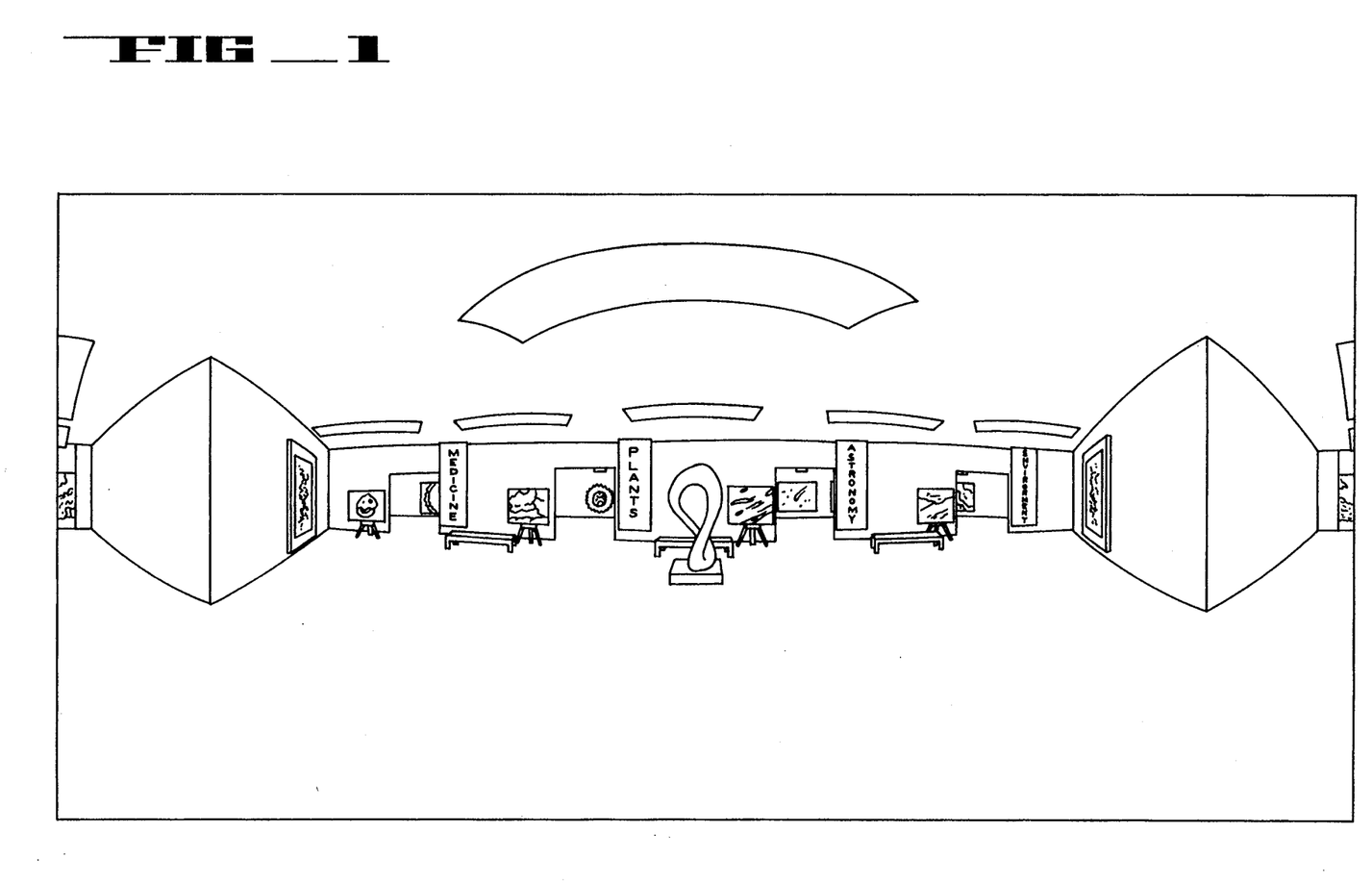
FIG. 1 illustrates a texture map, in this case a parametric spherical environment map, as may be used by the preferred embodiment of the present invention.

Typically, a parametric spherical environment map is twice as wide as it is high since a sphere is twice the distance around the equator as it is from pole to pole. All regions are sampled at least as much as at the equator. Regions near the poles are oversampled. FIG. 1 shows a parametric spherical environment of a museum atrium. The parametric spherical environment map contains the pixel values which are used to display the parametric spherical environment.

Parametric spherical environment maps have a number of useful properties.

- The environment is stored in a single contiguous image.
- They sample the environment completely.
- Translation along the equatorial direction in the map corresponds with rotation about the poles of the sphere.
- The environment is always sampled at least as frequently as at the equator.

Means for viewing a spherical environment map may be characterized by the algorithm used for display and by the speed with which different degrees of freedom for the view point may be updated.

KNOWN TECHNIQUES FOR RENDERING SPHERICAL ENVIRONMENT MAPS

A related area to such rendering is termed texture mapping. In texture mapping a texture file (or image) is applied to points on an object being rendered. This is conceptually analogous to putting a decal on a solid object. In any event, rendering spherical environment maps and textured spheres may be done using a number of different known approaches. The most appropriate approach for doing this will depend on the number of degrees of freedom required during an interactive viewing session. In any event, when rendering a parametric spherical environment map, one may consider the environment to be a texture on the surface of a sphere in 3-D space. A viewpoint with respect to the sphere will determine what is seen by the viewer. For example, the viewpoint may be outside the sphere looking at it as a whole, or it may be a perspective view from within the sphere.

Direct Scan-Con Version

For the general perspective case, i.e. unrestricted directions of manipulation, one approach is to compute the analytic form of the intersection between a plane (formed by the viewpoint and a scanline) and the sphere. In an article entitled "Simulation of Natural Scenes Using Textured Quadric Surfaces", *Computer Graphics*, Geoffrey Y. Gardner, Vol. 18, No. 3, pgs. 11–20, July, 1984, such a scheme was used for textured ellipsoids. Because the surface texture was a procedural texture which only depended on the surface (x, y, z) point, the (u, v) parameters for the surface were not required. The additional computational requirements for the (u, v) values make this general approach suitable for a non-real time system, but prohibitive for real-time use on personal computers without special rendering hardware. Such special hardware may significantly increase the cost of the computer system.

Texture Map Indirection

An alternative approach is to restrict the degrees of freedom with which the viewer may manipulate the sphere. If the sphere is in a fixed position, with a fixed size, a technique called texture map indirection may be used. The sphere is first rendered into a look-up-table, which is the same size as the final image. This is known as the screen look-up-table. Each look-up-table pixel contains the surface (u, v) value for the rendered sphere.

The "u" index is along the equator; while the "v" index is between the poles. When computing the final image, the contents of the screen look-up-table are used to index into the parametric spherical environment map. If this is done directly, this process would always obtain the same image of the sphere. However, if the sphere u index is offset before being used to look up the texture value, the spherical texture appears to rotate about an axis passing through the poles. This has the effect of allowing a single rotational degree of freedom for the textured sphere or spherical environment. This technique is similar to that described in an article entitled "An Image Synthesizer", Ken Perlin, *Computer Graphics*. Vol. 19, No. 3, pgs. 287–296, 1985. In the article, the shading is being changed for a fixed geometric scene.

OBJECT OF THE PRESENT INVENTION

It is desirable to provide a rendering means which allows for rotation of textured spheres and spherical environment maps along multiple axes without the requirement of specialized hardware rendering devices. Thus, it is an object for the present invention to provide a means for rendering textured spheres and spherical environment maps that may be rotated and viewed along multiple axes in real-time, and in a cost-effective manner.

SUMMARY

A method and apparatus for rendering textured spheres and spherical environment maps is disclosed. The present invention describes a rapid scheme for viewing textured spheres and spherical environment maps. The intention is to let the user interact with textured spheres and environment maps in real-time, with the view direction and field of view under user control. The viewing screen is assumed to be flat, such as a computer monitor. The real-time interaction may be done without the use of any special purpose graphics hardware. The method of the present invention provides for real time rotation along multiple axes. A two-level indexing scheme for accessing pixel data in a parametric spherical environment map (or texture map), is used to identify shading values for pixels in a display window. The two-level indexing scheme is comprised of a screen look-up table and a parametric look-up table. The screen look-up table has the dimensions of the display window, whereas the parametric look-up table has the dimensions of the parametric spherical environment map. The screen look-up table is similar to the screen look-up table for texture map indirection except that it is rotated by ninety degrees, so that the polar axis is horizontal. The parametric look-up table is a transformation of a spheres u,v coordinates having the polar axis along the Z axis, to a sphere with u,v coordinates having the polar axis along the Y axis.

The method for the present invention is comprised primarily of the steps of: providing a parametric spherical environment map of the image to be viewed, generating a screen look-up table comprised of look-up addresses, generating a parametric look-up table comprised of index values into the parametric spherical environment map, and for each look-up address in the screen look-up table, mapping to an entry in the parametric look-up table, retrieving the value in the entry, and using the value to retrieve pixel values from the parametric spherical environment map. Rotation or movement of the view being seen is accomplished by adding offsets to the look-up address and/or the index values.

The method of the present invention may be practiced on a computer system that does not require specialized rendering hardware. However, certain embodiments of the present invention as described herein may derive benefits of dedicated hardware facilities.

DETAILED DESCRIPTION OF THE PREFERRED EMBODIMENT

A method and apparatus for rendering textured spheres and spherical environment maps, is described.

In the following description, numerous specific details are set forth such as the conversion of angular coordinates to dimensional coordinates, in order to provide a thorough understanding of the present invention. It will be apparent, however, to one skilled in the art that the present invention may be practiced without these specific details. In other instances, specific implementation details, such as table data structures, have not been shown in detail in order not to unnecessarily obscure the present invention.

OVERVIEW OF A COMPUTER SYSTEM IN THE PREFERRED EMBODIMENT

Figure 2:
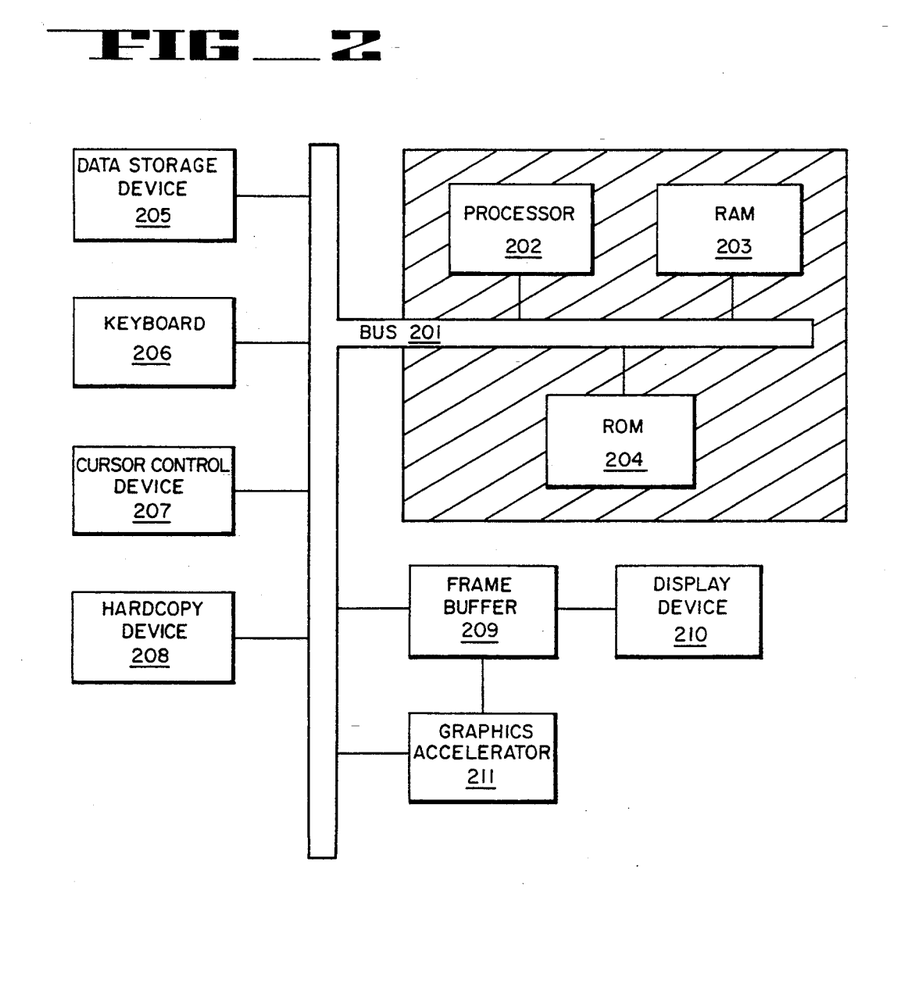
FIG. 2 is a block diagram of a computer system as may be utilized by the preferred embodiment of the present invention.

The computer system of the preferred embodiment is described with reference to FIG. 2. The present invention may be implemented on a general purpose microcomputer, such as one of the members of the Apple® Macintosh® family, one of the members of the IBM Personal Computer family, or one of several work-station or graphics computer devices which are presently commercially available. In any event, a computer system as may be utilized by the preferred embodiment generally comprises a bus or other communication means 201 for communicating information, a processor means 202 coupled with said bus 201 for processing information, a random access memory (RAM) or other storage device 203 (commonly referred to as a main memory) coupled with said bus 201 for storing information and instructions for said processor 202, a read only memory (ROM) or other static storage device 204 coupled with said bus 201 for storing static information and instructions for said processor 202, a data storage device 205, such as a magnetic disk and disk drive, coupled with said bus 201 for storing information and instructions, an alphanumeric input device 206 including alphanumeric and other keys coupled to said bus 201 for communicating information and command selections to said processor 202, a cursor control device 207, such as a mouse, track-ball, cursor control keys, etc, coupled to said bus 201 for communicating information and command selections to said processor 202 and for controlling cursor movement. Additionally, it is useful if the system includes a hardcopy device 208, such as a printer, for providing permanent copies of information. The hardcopy device 208 is coupled with the processor 202 through bus 201.

Also coupled to the computer system of the preferred embodiment is a frame buffer 209 which is further coupled to a display device 210, preferably a display device capable of displaying color graphics images or high resolution monochrome graphical images. The frame buffer 209 contains the pixel data for driving the display device 210. In some implementations, the display device 210 may be optionally coupled to a rendering device 211, also known as a graphics accelerator. Typically, such a rendering device 211 is coupled to the bus 201 for communication with the processor 202 and frame buffer 209. The preferred embodiment is implemented for use on Macintosh® family of computers available from Apple® Computer, Inc. of Cupertino, Calif.

It should be noted that the processor 202 performs various parts of the rendering method, such as table creation and table look-ups. Further, such created tables and other data may be stored in RAM 203 (for data that is dynamic in nature), or in data storage device 205 or ROM 204 (for data that is static in nature).

Finally, it should be noted that an alternative embodiment of the present invention may be practiced on a system of fixed functionality. For example, it would be apparent to one skilled in the art to provide a fixed set of screen look-up tables stored in ROM, wherein views of data are limited to mappings to the fixed set of screen look-up tables. Alternatively, a graphics accelerator, as described above, may be designed which embodies the present invention.

OVERVIEW OF RENDERING METHOD OF THE CURRENTLY PREFERRED EMBODIMENT

Figure 3:
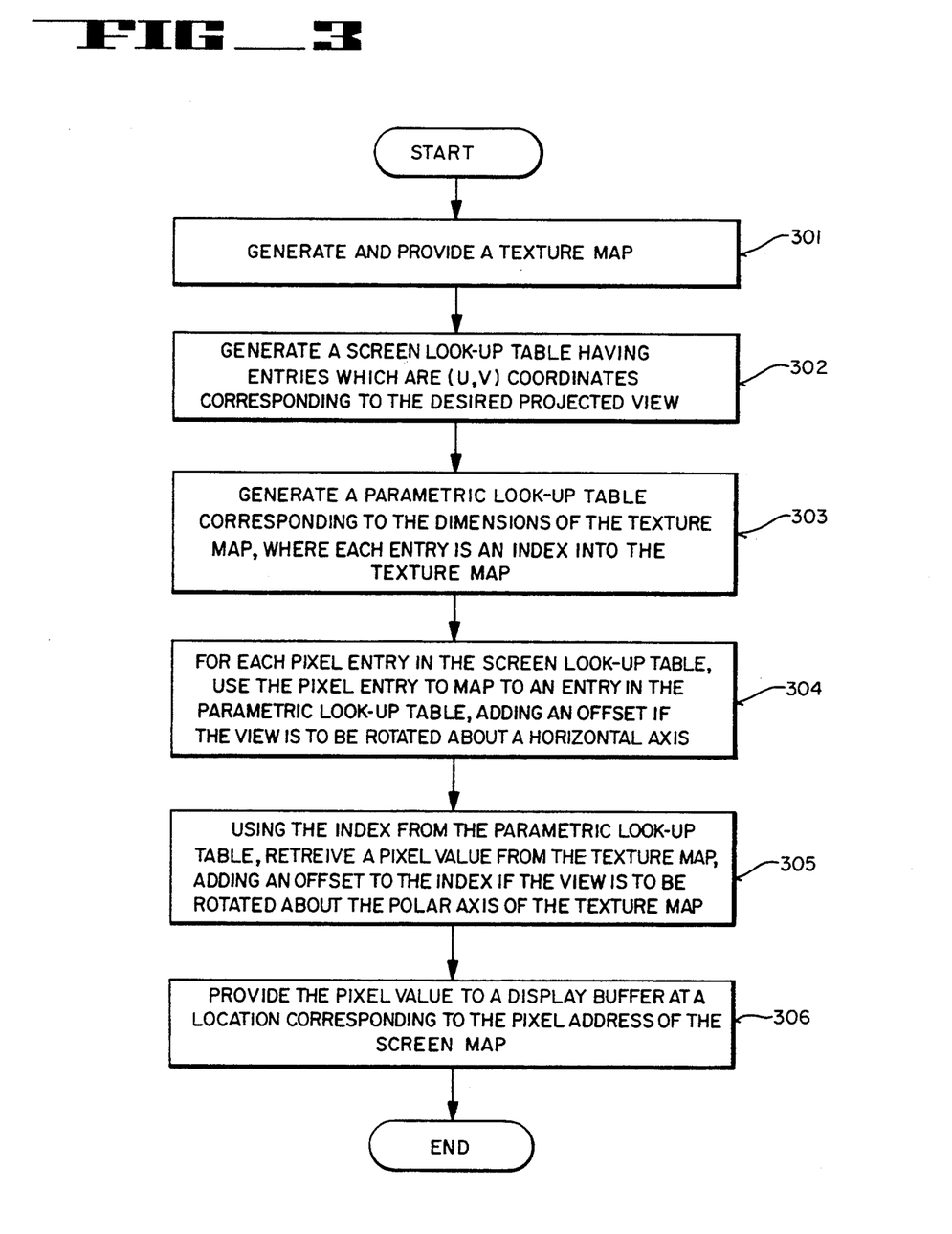
FIG. 3 is a flow chart illustrating the overall method of the preferred embodiment of the present invention.

The rendering method of the currently preferred embodiment is referred to as texture map double indirection. The name is derived from the use of two distinct maps for identifying pixel values in a texture map for rendering a particular object. In a currently preferred and implemented embodiment, the texture map is a parametric spherical environment map, such as described in the prior art. However, it would be apparent to one skilled in the art to use other forms of a texture map, without departing from the spirit and scope of the present invention. In any event, the terms parametric spherical environment map and texture map are used interchangeably in this description. FIG. 3 is a flow chart illustrating the overall flow of the method of the preferred embodiment. It is important to note, that it would be apparent to one skilled in the art that certain steps, namely steps 301–303, could be performed in a different order. The order in which each of these steps is presented in FIG. 3 is merely one sequence in which they can be performed. First, a texture map, i.e. a parametric spherical environment map, is generated and provided to a rendering means, step 301. Next, a screen look-up table is generated, step 302. The screen look-up table will have (u,v) coordinates as entries. As noted previously, the u index is along the equator, whereas the v index is between the poles. These (u,v) entries correspond to the desired projected view. Typically, the screen look-up table will be created by rendering the object or perspective of the desired projected view. Next, the parametric look-up table is generated, step 303. The parametric look-up table will have (u',v') coordinate entries which are orthogonal to the desired projected view of the screen look-up table. The parametric look-up table will have dimensions which are identical to the texture map. Once the foregoing steps have been completed, an image may be rendered.

Pixel rendering occurs, by identifying a pixel value for each pixel entry in the screen look-up table. For each pixel in the screen look-up table, a corresponding entry in the parametric look-up table is obtained, step 304. If rotation about a horizontal axis of the displayed sphere is desired, an offset is added to the u index of the entry from the screen look-up table in order to find the entry in the parametric look-up table. Using the index obtained from the parametric look-up table, a pixel value from the texture map is obtained, step 305. If a rotation about the polar axis of the displayed sphere is desired, an offset is added to the u' index of the index from the parametric look-up table. Finally, the pixel value obtained from the texture map is provided to a display buffer at a location corresponding to the pixel address described in the screen look-up table, step 306. As noted above, the foregoing steps 304–306 are repeated for each pixel entry in the screen look-up table.

Relationship Between Tables, Texture Map and Display

Figure 4:
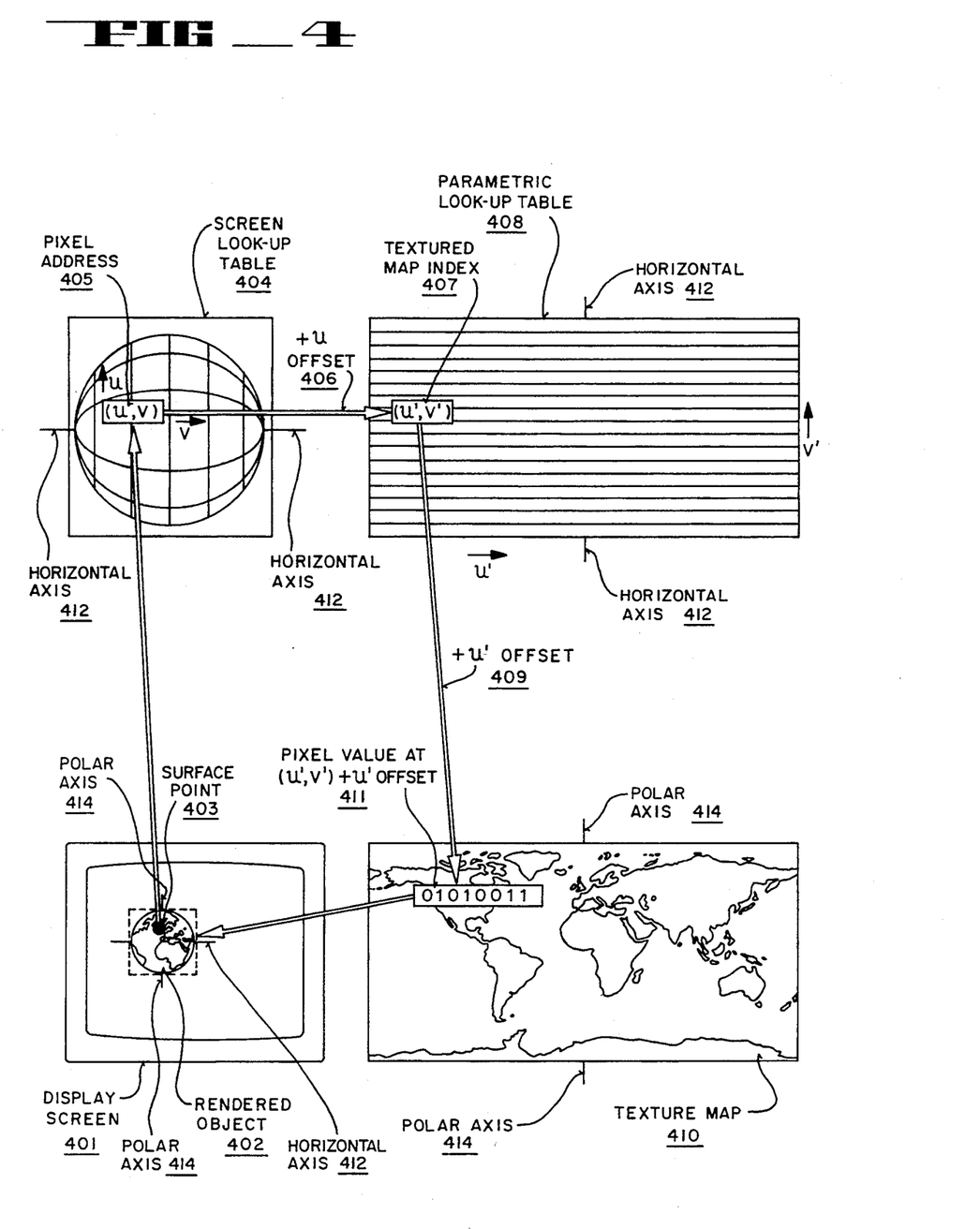
FIG. 4 illustrates the relationships between the various tables, computer screen display, and the texture map as utilized by the preferred embodiment of the present invention.

FIG. 4 illustrates a relationship between the screen look-up table, the parametric look-up table, the texture map (i.e., the parametric spherical environment map), and the rendered object on a display screen. In this illustration a globe is rendered. A screen look-up table 404 is used to represent a rendered object 402, here a sphere, on a display screen 401. In this case the screen look-up table 404 is for an orthographic projection of a sphere. For each surface point 403 on rendered object 402 a corresponding pixel address 405 exists in screen look-up table 404. During rendering, a pixel address 405 is used to find an entry in a parametric look-up table 408. The parametric look-up table 408 is generated so as to flip the "sphere" ninety degrees about an axis perpendicular to a north south vector of the texture map. As noted above, the parametric look-up table 408 will contain indices into a texture map, here texture map 410 (here a spherical environment map for a globe). Here, the pixel address 405 maps to a texture map index 407. The texture map index 407 is used to obtain a pixel value in a texture map 410. Here, the texture map index 407, indexes the pixel value at (u',v') 411. This pixel value 411 corresponds to the pixel value for the surface point 403. As noted with reference to FIG. 3, if a rotation about a horizontal axis is desired, a u offset 406 is added to the u index of the pixel address 405, which is used to find the entry in the parametric look-up table 408. Similarly, if rotation about a polar axis is desired, a u' offset 409 is added to the u' index of the texture map index 407 which is used to find the pixel value 411.

Also illustrated in FIG. 4 are the axes of rotation. The screen look-up table 404 has a rotation axis 412 which is horizontal. The creation of the screen look-up table is described in more detail below. With respect to the parametric look-up table 408, the screen X-axis (screen look-up table horizontal axis) 412 is illustrated. Finally, a polar axis 414 of texture map 410 is illustrated on display screen 401. This reflects the ninety (90) degree rotation of the orientation of the parametric look-up table 408. The horizontal rotation axis 412 is also illustrated on the display screen 401.

Parametric Spherical Environment Map

Known techniques exist for creating a parametric spherical environment map that is utilized in the preferred embodiment. Thus, no discussion concerning the creation of a parametric spherical environment map is deemed necessary.

GENERATION OF THE SCREEN LOOK-UP TABLE

When computing the screen look-up-table, a number of approaches may be used. The image (e.g., the sphere) can be rendered using ray-tracing or scan-conversion algorithms. If the sphere size and location and the viewing position are unchanged, the table is computed only once. If however, some parameters change frequently, it is beneficial to optimize this calculation. In the preferred embodiment, two cases are worth considering. The first is an orthographic projection of a sphere. The second is when the viewing position is at the center of the sphere looking at the environment map on the sphere's surface using a perspective projection.

It should be noted that the screen look-up table described herein may be utilized in the texture map indirection of the prior art or the texture map double indirection of the present invention.

However, in a single texture map indirection case, the axes are flipped so that offsetting the screen table u index rotates the sphere about the polar axis which is vertical (i.e., screen parallel to the y-axis.).

Orthographic Projections

Rendering textured spheres in orthographic projection is useful in two applications. The first is rendering globes of terrestrial or planetary databases. The second is when rendering environment maps as if viewed through a fish-eye lens. The zoom factor for the rendering may change when the user wants to examine the center of the spherical projection in more detail, such as when zooming in on a globe. This would cause a re-computation of the screen look-up table.

Figure 5:
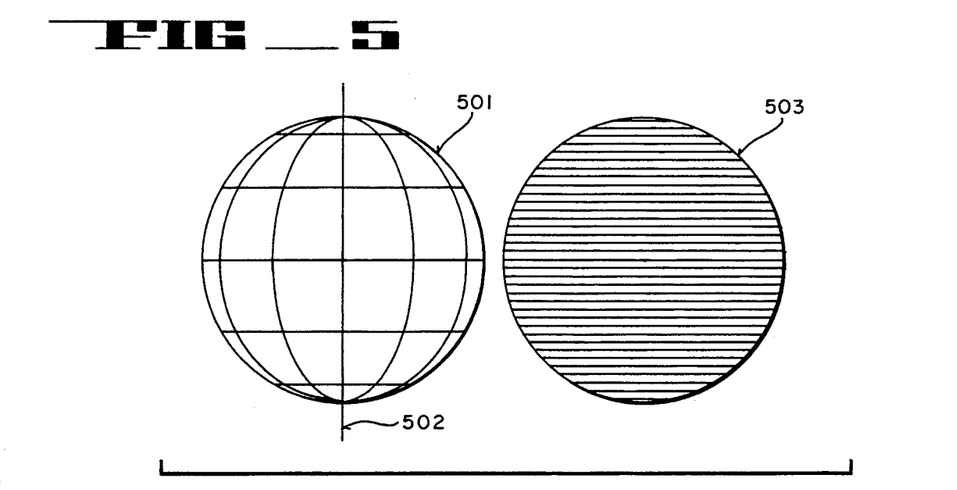
FIG. 5 illustrates the geometry of a sphere for the creation of a screen look-up table for orthographic projections, as may be utilized in the preferred embodiment of the present invention. The screen look-up table corresponds to the screen look-up table of FIG. 4 rotated by ninety (90) degrees in the plane of the screen.

FIG. 5 shows the geometry of such a configuration. Referring to FIG. 5, a sphere 501 is shown with respect to a circle 503 with a set of scanlines. What will be computed is how the scanlines intersect with the sphere. The screen look-up-table will be used to rotate the sphere 501 about a vertical axis 502.

The symmetry of a sphere in orthographic projection has a number of simplifying characteristics. For a horizontal row of pixels, the v parameter (from pole to pole) is constant. For each row of pixels, the u parameter variation is a scaled version of the variation for the central row of pixels. This means that the screen look-up-table u parameter may be computed very rapidly by scaling a 1-D look-up-table for a single scanline.

The screen look-up-table does not have to be computed exactly because the subsequent table look-up for display, will preferably use a method which works with nearest pixel arithmetic. Because of this, the inverse sine function may be stored as entries in a small inverse sine look-up-table to be used in calculating screen look-up table entries, negating the need for interpolation.

TABLE A contains pseudo-code which describes the definition of the screen look-up-table for a sphere in an orthographic projection. It assumes that the image displayed on tile screen is square. In the pseudo-code, "&" means logical AND "|" means logical OR, and << means logical left shift.

TABLE A

1. Generate an inverse sine look-up table;
2. zoom = zoom factor for the display of the sphere;
3. Repeat lines 4 and 5 for each column of the screen look-up-table;
4. normalizedY = (y-coordinate of the scanline − halfScreenYSize)/(zoom * halfScreenYSize);
5. v-Index = asin(normalizedY) * (vertical width of texture map);
6. columnScalingFactor = 1.0 / (sqrt(1.0 − normalizedY* normalizedY) * zoom);
7. Repeat lines 8–10 for each pixel within the circular outline of the sphere on the current scanline;
8. normalizedX = ((x-coordinate of the pixel − halfScreenXSize)/halfScreenYSize);
9. uIndex = asin(normalizedX * ColumnScalingFactor) * uSize;
10. pixelIndex = vIndex << ubits | uIndex;

Description of Table A

Line 1 provides for the initialization of an inverse sine look-up table to be used in calculating screen look-up table values. Line 2 describes a zoom factor which may be used to compute or recompute the rendering of the sphere. The zoom factor allows for zooming closer to and away from the sphere as it is viewed. Line 3 begins the looping for each column in the look-up table. As noted above, the u index remains constant for each column. First, at line 4 a normalized Y is calculated. The normalized Y provides for the zooming in the display of the sphere. At line 5, the v index is calculated using the inverse sine look-up table. At line 6 a column scaling factor is then determined. Recall that the column scaling factor will be used to quickly calculate the horizontal or u index for each of the pixel addresses. At line 7 a loop for pixels within the circular outline of the sphere on the current scanline is calculated. Note that the portions of the screen look-up table outside of the sphere, contain black pixel values. First at line 8 a normalized X is calculated. This is calculated for the same reasons and in a similar manner as the normalized Y of line 4. A u index is then calculated using the inverse sine look-up table, at line 9. Finally at line 10, the pixel index is defined as the v index shifted over by u bits (i.e., the number of significant bits in u) followed by the u index. In order to minimize the amount of space (i.e., memory) required to store the screen look-up table, the v index and u index are packed into a single word with the v value shifted to the left by enough bits to leave room for the range of u values. In this manner, the screen look-up table is stored as contiguous words (or a 1-dimensional array) rather than a 2-dimensional array. However, it would be apparent to one skilled in the art to utilize separate words for each of the respected index values. Further, note that the pixel index created by performing a logical "OR" functions between the shifted v index and the u index.

Creating the screen look-up table is slower than indexing the screen look-up-table once it has been created. Thus, it is preferable to break the computation into a preprocessing step and a subsecluent table look On the other hand, where memory is very limited, the indices for u and v could be computed dynamically.

The Look-Up-Table for a Viewing Position at the Center of a Sphere

Rendering textured spheres, when the viewing position is at the center, is particularly useful when viewing spherical environment maps. Rather than a sphere, what is viewed is a portion of a spherical environment map from a particular perspective. Because this is a perspective projection, the vertical scanlines of the final image no longer correspond to parallel planes in the model space. When the viewing position is at the center of the sphere and the viewing direction is in the plane of the equator, vertical scanlines in the final image correspond to planes which all pass through the poles of the sphere. The geometry for this arrangement is shown in FIG. 6.

Figure 6:
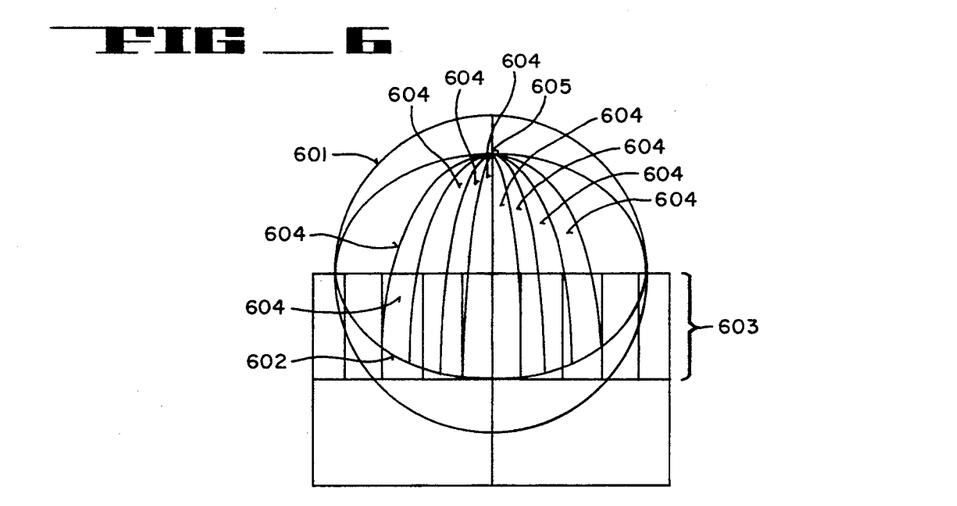
FIG. 6 illustrates the geometry for the creation of a screen look-up table where the view position is at the center of the sphere and the viewing direction is in the plane of the sphere, as may be utilized by the preferred embodiment of the present invention. The screen look-up table corresponds to the screen look-up table of FIG. 4 rotated by ninety (90) degrees in the plane of the screen.

Referring to FIG. 6, a sphere 601 has an ecluator 602. As noted above, the viewing direction is in a plane of the ecluator 602. Vertical scanlines 603 for the look-up table correspond to planes 604 which pass through poles 605.

Figure 7:
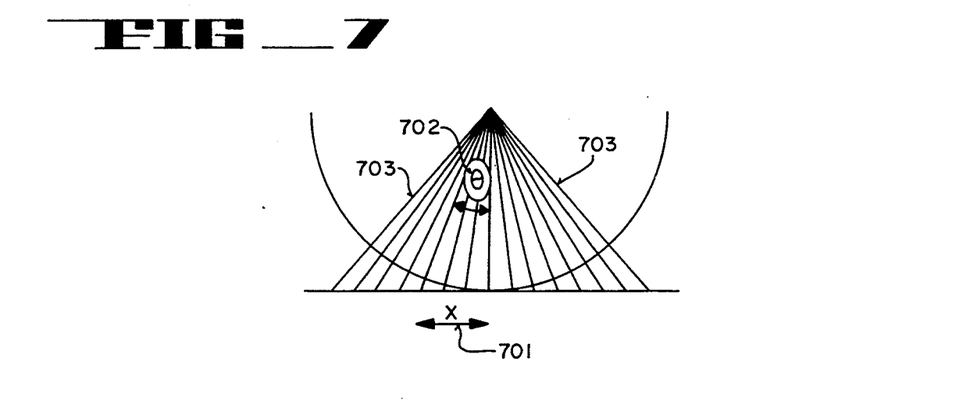
FIG. 7 further illustrates the creation of a screen look-up table of FIG. 6, in particular, the vertical scan-lines as planes through a sphere as may be utilized by the preferred embodiment of the present invention.

The relationship between the lateral position on the display screen and the angular position on the equator is illustrated in FIG. 7. This is given by X=tan ($\theta$). Referring to FIG. 7, the X value 701 lies in a direction which is orthogonal to the polar axis and is parallel to the screen horizontal axis. The angle $\theta$ 702 represents the position of a scanline with respect to the viewing position. The angle $\theta$ 702 is the angle between each of the planes 703 and the viewing direction.

The relationship between the screen coordinate x, y and the elevation angle $\phi$ is given by $$\text{radius } r = (1 + x^2)^{\frac{1}{2}}$$

$$\phi = \tan^{-1}(y/r)$$

Since the expression for $\phi$ depends on scaling y and then finding the inverse tangent value, a table of inverse tangent values may be used to speed the computation. The following pseudo-code fragment exemplifies the calculation of $\phi$.

TABLE B 1. yRange = tan(FieldOfView / 2);
2. xRange = yRange * aspectRatio;
3. Loop for each column of pixels with horizontal screen coordinate "x" where x goes from −xRange to xRange;
4. radius = sqrt(1.0 + x*x);
5. yIncrement = 1.0 / (radius * yScreenPixels);
6. yCoordinate = −yRange / radius;
7. Loop for each pixel in the column;
8. $\phi$ = inverseTanTable(yCoordinate);
9. yCoordinate = yCoordinate + yIncrement;

Description of Table B

At lines 1 and 2, the range of values for y and x are calculated. Note that the actual range that is derived from the calculation is −yRange to +yRange and −xRange to +xRange, respectively. Next, line 3 initiates an outer loop for each column of pixels. First, at line 4 a radius for the column is calculated. At lines 5 and 6, a y increment and y-coordinate are respectively calculated. At line 7, a loop for each pixel within in a column is initiated. At line 8, the angular coordinate is calculated using the inverse tangent table. Finally, at line 9, a new Y-coordinate for a pixel in the column is calculated.

Generation of the Parametric Look-Up Table

As described with respect to the prior art, texture map indirection uses rotational symmetry about one axis to give one rotational degree of freedom. A sphere, however, has rotational symmetry about any axis which passes through its center. By using two levels of indirection, it is possible to render a sphere with two rotational degrees of freedom. The first look-up-table is the same as for texture map indirection. It is a sphere rendered into an image the same size as the screen window.

The second look-up-table is the parametric index table (or map). The parametric index table is the same size as the parametric spherical texture map. Each pixel in the parametric look-up table contains a mapping of the sphere (u, v) parameters to another sphere rotated by 90 degrees about an axis perpendicular to the poles of the original sphere.

The method loops for each pixel in the parametric texture table computing the ($\theta$, $\phi$) spherical (or angular) coordinates from that pixel (u, v) indices and, from these, finding the direction vector for that surface point on the sphere.

$$D_x = \cos(\theta) \sin(\phi)$$

$$D_y = \cos(\theta) \cos(\phi)$$

$$D_z = \sin(\theta)$$

The direction vector D is then rotated about the Z-axis and the result is used to find a new pair of ($\theta$, $\phi$)

values which are then encoded in the parametric look-up-table for that surface point using the equations:

$$d_x = D_y$$

$$d_y = -D_x$$

$$d_z = D_z$$

$$\phi' = \tan^{-1}(d_x/d_z)$$

$$\theta' = \sin^{-1}(d_y)$$

When computing a view of the final image of the sphere or spherical environment map, the screen look-up-table is used to find a location in the parametric look-up-table. Using the contents of this second table to index into the parametric spherical environment map has the effect of rotating the sphere by 90 degrees so that the poles of the sphere texture are now orthogonal to the poles of the screen-space sphere.

Adding a u-offset to the contents of the second table before indexing into the surface texture has the effect of rotating the sphere about the texture's polar axis. This leads to a sphere renderer which has two rotational degrees of freedom. The first rotates the sphere about the X-axis and the second rotates the sphere about its pole. A third rotational degree of freedom could be obtained using a two-dimensional rotation in the image plane.

Table C contains pseudo code for generating the Pixel values for an image to be displayed. It assumes that the texture map is a power of two in the horizontal direction. As before, the u and v values have been packed into a single word with the v value shifted to the left by enough bits to leave room for the range of u values. This packing saves memory in the look-up table.

TABLE C 1. uXOffset = xRotationAngle * uTextureSize/ (2.0 * π);
2. uYOffset = yRotationAngle * uTextureSize/ (2.0 * π);
3. uMask = uTextureSize − 1;
4. vMask = (uTextureSize * vTextureSize) − (1 + uMask);
5. loop for each screen pixel in the screen look-up table;
6. sIndex = Screen look-up-table value for current pixel;
7. parametricIndex = (sIndex & vMask) | ((sIndex + uXOffset) & uMask);
8. pIndex = parametric look-up-table value at location parametricIndex;
9. textureIndex = (pIndex & vMask) | ((pIndex + uYOffset) & uMask);
10. pixel color = texture entry value at location textureIndex;

Description of Table C

Lines 1 and 2 define the X offset and Y offset for the view being rendered. Such offsets will be generated responsive to a rotate or per request. At lines 3 and 4 masks for the u and v coordinates are generated. Line 5 indicates the beginning of a loop for generating each of the screen pixels from the screen look-up table. At line 6, a screen index is provided. The screen index is the value for the current pixel in the screen look-up table. A parametric index is then calculated from the entry in the screen index at line 7. This is accomplished by a series of logical functions; that screen index and the v mask are "AND"ed, the horizontal axis u offset is added to screen index then "AND"ed with the u-mask, and the "OK" value is derived from the two remaining values. At line 8 the parametric look-up table at the location within the metric look-up table is calculated. At line 10, the index into the texture map is calculated. This is accomplished by performing an "AND" function between the parametric index and v mask which is "OR"ed with the parametric index added to the polar axis u offset which is "AND"ed with u-mask. And finally, at line 10 the pixel color for the pixel being rendered from the texture map.

TEXTURED SPHERE EXAMPLE

Figure 8:
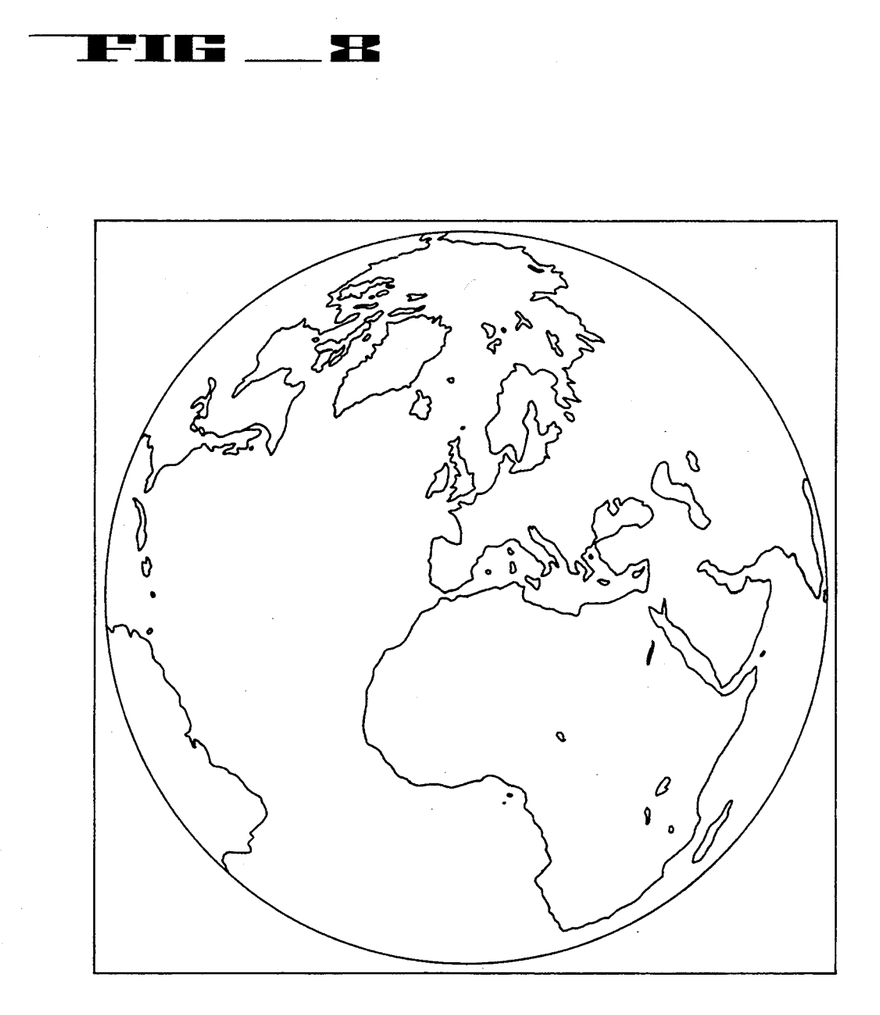
FIG. 8 is an example of a textured sphere, i.e. a globe, as may be rendered using the preferred embodiment of the present invention.
Figure 9:
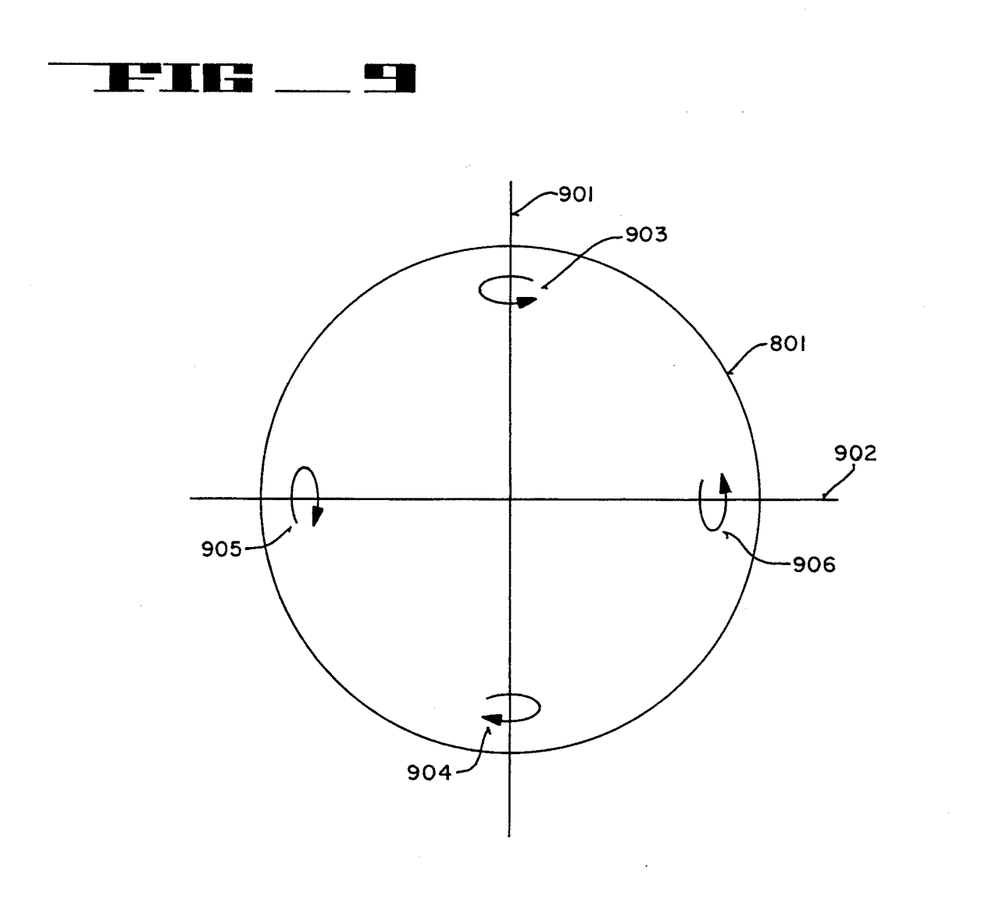
FIG. 9 illustrates the axis of rotation for a textured sphere as may be utilized by the preferred embodiment of the present invention.

FIG. 8 illustrates a map of the world rendered on the surface of a globe using the texture map double indirection method of the preferred embodiment. Referring now to FIG. 9, the directions of rotation are illustrated. The globe may be rotated around an axis defined by the poles 901 or by the screen horizontal axis 902. As described above, such rotation is accomplished by offsetting the u index of the parametric index table entry. Movement around the polar axis 901 is illustrated by the directions 903 and 904. Note that the polar axis 901 here is illustrated as a vertical line. However, the polar axis 901 would change orientation as the textured sphere is manipulated. In any event, as described above, such a rotation is accomplished by offsetting the u index of the screen look-up table value. The directions around the equator 902 are illustrated by the directions 905 and 906.

SPHERICAL ENVIRONMENT MAP EXAMPLE

Figure 10:
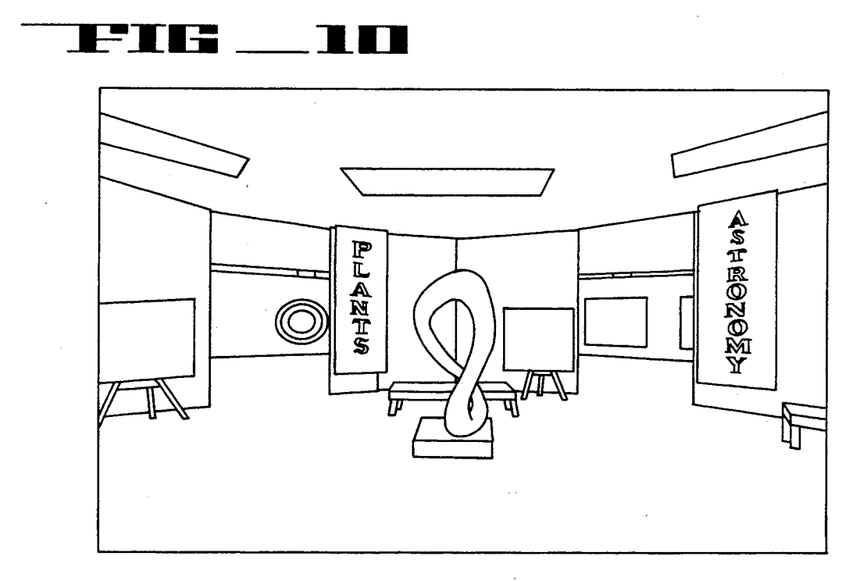
FIG. 10 is an example of a spherical environment map projected onto a viewing plane, where the viewing position is at the center of the sphere, i.e. of a museum atrium, as may be rendered using the preferred embodiment of the present invention.

FIG. 10 is an example of a spherical environment map projected onto an image plane using the texture map double indirection of the preferred embodiment.

Figure 11:
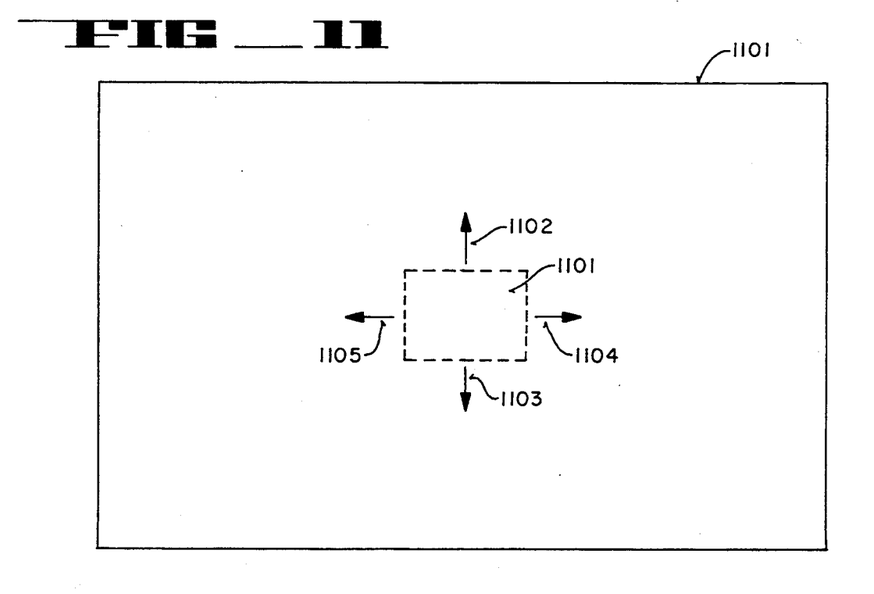
FIG. 11 illustrates the effect of and direction of panning through a parametric spherical environment map, as may be performed by the preferred embodiment of the present invention.

Referring now to FIG. 11, the panning of the image viewed is shown with respect to a parametric environment map 1101. As illustrated by FIG. 11, the image viewed 1001 can be panned in north, south, east, west directions as indicated by arrows 1102-1105, respectively. The panning in the north and south directions is equivalent to rotating a sphere about a horizontal axis (by offsetting the u index of the parametric index table entry). Similarly, the panning of the image view from left to right is analogous to rotating a sphere about a polar axis (by offsetting the u index of the screen look-up table values).

Manipulation and Viewing of a Textured Sphere and Spherical Environment Map

Manipulation of the textured sphere or parametric environment map occurs in a manner that would be familiar with the user interface of the Apple ® Macintosh ® family of Computers. The technique will be described first with reference to a textured sphere. The technique can be characterized as a click-drag-release sequence. In such a sequence, a user positions a cursor anywhere on the display of the sphere. Using a cursor control device, such as a mouse, a user would position the cursor on a desired location (view position), depress a switch associated with the cursor control device (i.e. click) and reposition the cursor to a desired position. The view of the textured sphere will then be rotated along polar and horizontal axes so that the position where the cursor was "clicked" rotates to the new position of the cursor. Thus, the original view position of the cursor will be "dragged" to the new position of the cursor. In any event, rotation will occur with the original position seeking to move to the location of the cursor, and will continue until the point is reached or the switch is released. Note that so long as the switch is not released, the original view position will continue to be "dragged" as the cursor is moved.

It should be further noted that the location of the polar axis may be changed during the course of viewing the sphere. This of course would cause a corresponding change to the orientation in which rotation of the sphere would occur.

Further, the speed of rotation (or velocity) is relative to the zoom factor. Thus, if a user was zoomed in close to the sphere, rotation of the sphere would be slower than it would be if the user is zoomed farther away. A velocity that is inversely proportional to the zoom factor (i.e. 1/zoom) is utilized in the preferred embodiment. The displacement angle is also relative to the distance that the cursor is re-positioned from the original position.

With respect to a spherical environment map, the cursor manipulation sequence is similar. However, since the viewpoint is from within the sphere, rather than a sphere rotating, what is viewed is different portions of the parametric environment map. Conceptually what occurs is that the view remains the same, but the sphere is rotated causing different portions of the sphere to come into view. Thus, the rotation of the sphere provides for the panning of the parametric environment map.

The various parameters for viewing a textured sphere or spherical environment map, e.g. zooming and velocity control, are provided through a pop-up window. The pop-up window is associated with the display of the textured sphere or spherical environment map. The various parameters would appear as options in the pop-up window. A user may control the desired parameters by positioning a cursor on a parameter control means within the pop-up window, such as a button or slider, and clicking on the cursor control device. Again, such pop-up windows are known to those familiar with the user interface of the Apple ® Macintosh ® computer.

Thus, a method and apparatus for rendering textured spheres and spherical environmental maps, and allowing rotation along multiple axes, in real-time and without requiring specialized rendering hardware, is disclosed.

We claim:

1. A method for rendering views of an image projected onto a sphere from a predetermined projection orientation with respect to a viewer, said views being capable of manipulation along multiple axes, said method comprising the steps of:
   a) providing a texture map comprised of a plurality of pixel shading values, said texture map providing an image to be viewed;
   b) generating a screen look-up table comprised of look-up addresses, said screen look-up table corresponding to a display window having said predetermined projection orientation with respect to a viewer;
   c) generating a parametric look-up table comprised of texture map indices, said parametric look-up table being of the same size as said texture map, said texture map indices in said parametric look-up table corresponding to information in said screen look-up table being rotated N degrees;
   for each look-up address in said screen look-up table;
   providing a first offset to said look-up address to identify a corresponding entry in said parametric look-up table, said first offset causing rotation of said image projected onto a sphere from a predetermined projection orientation with respect to a viewer along a first axis;
   providing a second offset to said identified corresponding entry in said parametric look-up table to create an index value into said texture map, said second offset causing rotation of said image projected onto a sphere from a predetermined projection orientation with respect to a viewer along a second axis, said second axis being different than said first axis;
   retrieving an entry in said texture map based on said index value, said entry being a pixel shading value for said look-up address in said screen look-up table.

2. The method as recited in claim 1 wherein said first axis is a horizontal axis and said second axis is a polar axis.

3. The method as recited in claim 1 wherein said texture map is a spherical environment map.

4. The method as recited in claim 1 wherein said step of generating a screen look-up table comprised of look-up addresses, said screen look-up table corresponding to a display window having a predetermined projection orientation with respect to a viewer, said predetermined projection orientation being an orthographic projection, said step of generating a screen look-up table is further comprised of the steps of:
   a) generating a set of look-up address for a central scanline of said display window;
   b) storing said set of look-up addresses for said central scanline;
   c) for each of the remaining scanlines in said display window:
   scaling said look-up address for said central scanline by a factor corresponding to the position of the scanline being processed; and
   storing said scaled look-up address in a corresponding location of said screen look-up table.

5. The method as recited in claim 1 wherein said step of generating a screen look-up table comprised of look-up addresses, said screen look-up table corresponding to a display window having a predetermined projection orientation with respect to a viewer, said predetermined projection orientation being at the center of a sphere, said step is further comprised of the steps of:
   a) computing an X-range and a Y-range for the projection orientation of a viewer;
   for each column of pixels with said X-range:
   b) computing a radius for said column;
   c) computing a Y-increment value;
   d) computing a Y-coordinate from said Y-range and said radius; for each pixel in said column:
   e) computing an inverse tangent, from said Y-coordinate and storing as an elevation angle; and
   f) assigning a Y-coordinate to equal a prior Y-coordinate value added to said Y-increment value.

6. The method as recited in claim 1 wherein said step of generating a parametric look-up table comprised of texture map indices is further comprised of the steps of:
   for each pixel address of said texture map:
   a) computing first angular coordinates corresponding to said pixel addresses;
   b) computing a direction vector corresponding to first linear coordinates of said pixel address, said direction vector having X, Y and Z axis components;
   c) rotating said direction vector around said Z-axis by ninety degrees;

d) computing second angular coordinates based on said rotation;

e) computing second linear coordinates from said second angular coordinates; and f) storing said second linear coordinates.

7. A method for for viewing textured spheres and spherical environment maps as rendered by the method of claim 1, wherein said method is comprised of the steps of:

a) positioning a cursor at a position on said textured sphere or said spherical environment map by moving a cursor control device at a first position;

b) depressing a switch associated with said cursor control device into a first position;

c) re-positioning said cursor by moving said cursor control device to a second position; and     d) rotating said textured sphere or said spherical environment map from said first position to said second position.

8. The method as recited in claim 7 wherein said step of rotating said textured sphere or said spherical environment map from said first position to said second position will terminate if said switch associated with said cursor control device is released into a second position.

9. A method for generating texture map indices for rotating the view of a textured sphere along a first axis and a second axis while rendering said textured sphere, said method comprising the steps of:

a) generating a screen look-up table representing an orthogonal view of a first sphere in a display window, said screen look-up table having a plurality of entries representing first sphere parameters (u,v);

b) generating a parametric look-up table representing a mapping of said first sphere parameters (u,v) to a second sphere, said second sphere rotated by N degrees about an axis perpendicular to the poles of said first sphere, where N is not zero, said parametric look-up table having a plurality of entries representing second sphere parameters (u′,v′), and     c) for each entry (u,v) in said screen look-up table,         combining a first offset with said entry (u,v) to create an index into said parametric look-up table, therein causing rotation of said textured sphere along said first axis,         retrieving an entry (u′,v′) from said parametric look-up table based on said index, and         combining a second offset with said entry (u′,v′) of said parametric look-up table to create a texture map index, therein causing rotation of said textured sphere along said second axis.

10. The method as recited in claim 9 wherein N is 90 degrees.

11. The method as recited in claim 10 wherein said step of combining said first offset with said entry (u,v) to create an index into said parametric look-up table is comprised of adding said first offset to said u parameter of said look-up table entry.

12. The method as recited in claim 11 wherein said step of combining said second offset with said entry (u′,v′) of said parametric look-up table to create a texture map index is comprised of the step of adding said second offset to said u′ parameter of said entry of said parametric look-up table.

13. The method as recited in claim 9 wherein said step of generating a screen look-up table representing an orthogonal view of a first sphere in a display window is further comprised of the steps of:

a) obtaining a zoom factor for the view to be rendered;

b) rendering said sphere in said display window based on said zoom factor to obtain look-up table addresses corresponding to an orthogonal view of said first sphere; and     c) storing said look-up table address in said screen look-up table.

14. The method as recited in claim 13 wherein said step of rendering said sphere in said display window based on said zoom factor to obtain look-up table addresses corresponding to an orthogonal view of said first sphere is further comprised of the steps of:

d) generating a set of look-up addresses for a central scanline of said display window based on said zoom factor;

e) storing said set of look-up addresses in corresponding locations in said screen look-up table; and     for each of remaining scanline in said display window performing the steps of:

f) scaling said look-up address for said central scanline by a factor corresponding to the position of the scanline being processed; and     g) storing said scaled look-up address in a corresponding location in said screen look-up table.

15. A method for generating texture map indices while rendering a view of a spherical environment map projected on a sphere with the viewing position at the center of said sphere for panning along a first axis and a second axis, said method comprising the steps of:

a) generating a screen look-up table representing a view of a first sphere having a viewing position at the center of said first sphere, said screen look-up table having a plurality of entries representing first sphere parameter (u,v);

b) generating a parametric look-up table representing a mapping of said first sphere parameters (u,v) to a second sphere, said second sphere rotated by N degrees about an axis perpendicular to the poles of said first sphere, where N is not zero, said parametric look-up table having a plurality of entries representing second sphere parameters (u′,v′)

for each entry (u,v) in said screen look-up table, combining a first offset with said entry (u,v) to create an index into said parametric look-up table, therein causing panning of said projected spherical environment map along said first axis,         retrieving an entry (u′,v′) into said parametric look-up based on said index,         combining a second offset with said entry (u′,v′) of said parametric look-up table to create a texture map index, therein causing panning of said projected spherical environment map along said second axis.

16. The method as recited in claim 15 wherein N is 90 degrees.

17. The method as recited in claim 16 wherein said step of combining said first offset with said entry (u,v) to create an index into said parametric look-up table is comprised of adding said first offset to said u parameter of said screen look-up table entry.

18. The method as recited in claim 17 wherein said step of combining said second offset with said entry (u′,v′) of said parametric look-up table to create a texture map index is comprised of the step of adding said second offset to said u′ parameter of said entry of said parametric look-up table.

19. A method of accessing texture map information for rotating the view of a textured sphere along a first axis and a second axis while rendering said textured sphere, said method comprising the steps of:

a) generating a screen look-up table representing a first sphere having a first orientation, said first sphere having a plurality of first sphere parameters (u,v), u corresponding to a position along the equator of said first sphere, v corresponding to a position between the poles of said first sphere, said screen look-up table having a plurality of first storage locations, each of said plurality of first storage locations corresponding to one of said plurality of first sphere parameters, each of said plurality of first storage locations for storing values corresponding to one of a plurality of second sphere parameters (u',v');

b) generating a parametric look-up table representing a second sphere having a second orientation rotated 90° from an axis perpendicular to an axis between the poles of said first sphere, said second sphere having said plurality of second sphere parameters (u',v'), said parametric look-up table having a plurality of second storage locations, each of said plurality of second storage locations corresponding to one of said plurality of second sphere parameters, each of said second plurality of storage locations for storing one of a plurality of indices to said texture map, and c) for each of said first sphere parameters (u,v), performing the following steps, providing a u offset, said u offset representative of a translation in a first direction, generating an address corresponding to (u+u offset, v), accessing a parametric look-up table index corresponding to said (u+u offset, v), said parametric look-up table index corresponding to one of said plurality of second sphere parameters (u',v'), providing a u' offset, said u' offset representative of a translation in a second direction, said second direction being 90° from said first direction, generating a texture map index corresponding to (u'+u' offset, v'), and accessing said texture map at a location corresponding to said texture map index.

20. The method of claim 19 wherein said screen look-up table includes an orthographic projection of said first sphere.

21. The method of claim 19 wherein said screen look-up table includes a perspective projection wherein a viewing position is at the center of a sphere.

22. The method of claim 19 wherein the number of calculations required to generate said screen look-up table is reduced using the symmetry of a sphere.

* * * * *